Feb. 28, 1956 J. W. FORRESTER 2,736,880

MULTICOORDINATE DIGITAL INFORMATION STORAGE DEVICE

Filed May 11, 1951

4 Sheets-Sheet 1

INVENTOR.
JAY W. FORRESTER
BY Kenway Jenney Witter & Hildreth
ATTORNEYS

MULTICOORDINATE DIGITAL INFORMATION STORAGE DEVICE

Filed May 11, 1951

INVENTOR.
JAY W. FORRESTER
BY Kenway, Jenney, Witter & Hildreth
ATTORNEYS

Feb. 28, 1956 J. W. FORRESTER 2,736,880

MULTICOORDINATE DIGITAL INFORMATION STORAGE DEVICE

Filed May 11, 1951 4 Sheets-Sheet 3

INVENTOR.
JAY W. FORRESTER
BY Kenway Jenney Witter & Hildreth
ATTORNEYS

INVENTOR.
JAY W. FORRESTER
BY Kenway Jenney Witter & Hildreth
ATTORNEYS

United States Patent Office 2,73

Patented Feb. 28, 2,736,880

MULTICOORDINATE DIGITAL INFORMATION STORAGE DEVICE

Jay W. Forrester, Wellesley, Mass., assignor to Research Corporation, New York, N. Y., a corporation of New York Application May 11, 1951, Serial No. 225,714

29 Claims. (Cl. 340—174)

This invention concerns a storage and selection system for digital information involving the use as a coincidence device of a group of materials having certain specific hysteresis characteristics and arranged in multi-coordinate groupings.

Existing devices for the storage of digital information involve the use of acoustic delay lines, magnetic drums, electrostatic storage tubes and the like. These systems may be classified as using two space coordinates or one time and one space coordinate in selecting any given piece of digital information. This results in relatively slow access time for any given piece of information as well as bulky construction.

The object of this invention is to store electrical information in a multi-dimensional array of coincidence devices, any one of which can be located by a relatively simple system of coordinate wires.

A further object of the invention is to provide a method for using as such coincidence devices materials having high hysteresis characteristics, such as magnetic cores or ferroelectric slabs forming non-linear condensers.

A further object is to provide a simpler, more compact, and more reliable information storage system than any now in operation.

With these objects in view, the present invention makes use of storage elements in the form of materials having an almost rectangular hysteresis loop. One form of the invention uses the high magnetic hysteresis properties of certain materials, while another form of the invention makes use of non-linear ferroelectric condensers whose charge-voltage diagrams resemble the B—H curve for the magnetic materials.

The use of magnetic cores is not in itself new, but in the past they have either been used to store isolated digits where selection is not difficult or arranged in the form of delay lines where time is one of the selecting dimensions. The present system, however, uses these cores as coincidence current devices which are unresponsive to a current of a given magnitude while responding to the simultaneous (i. e. coincidental) application of two or more such currents.

Figure 1:
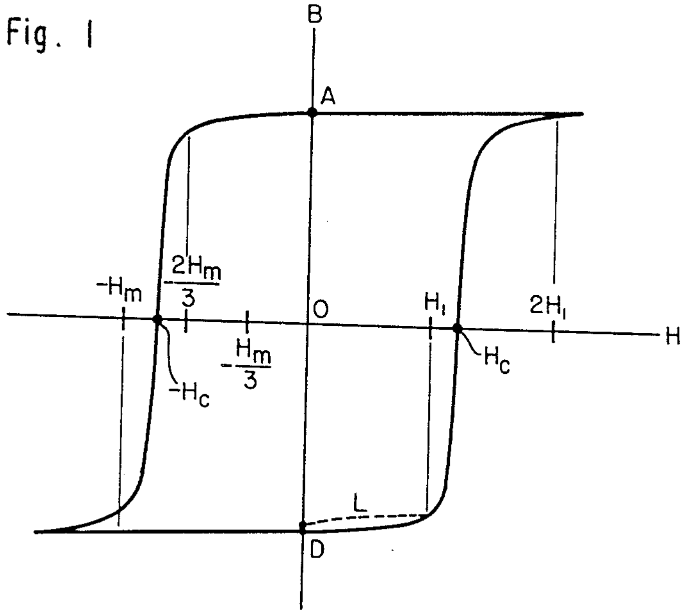
Figure 2:
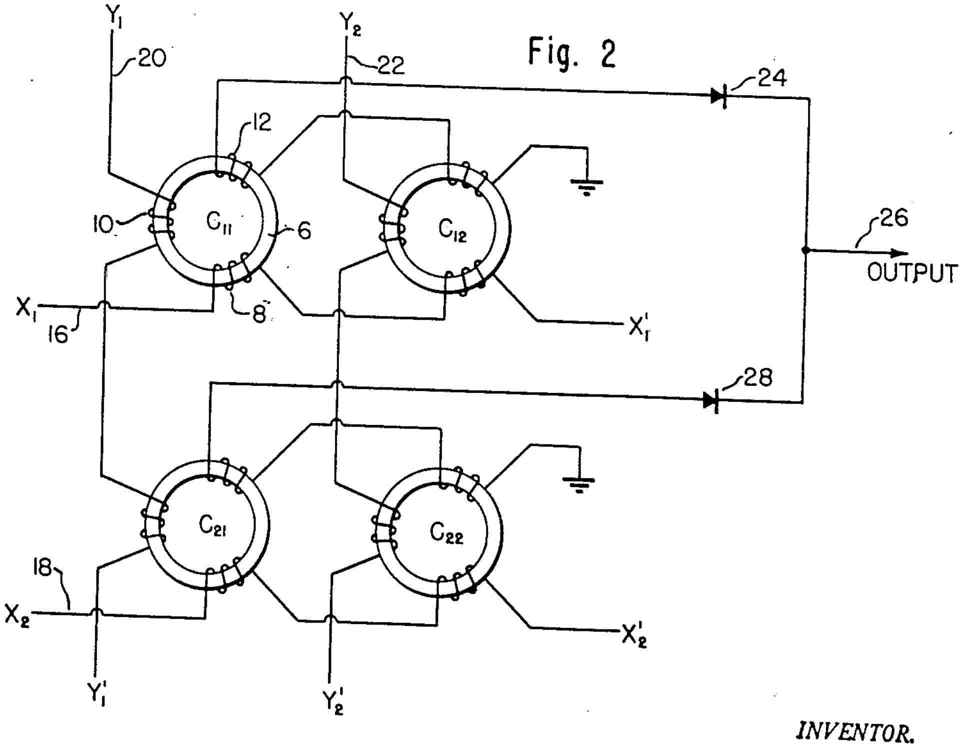
Figures 3, 4, 4A:
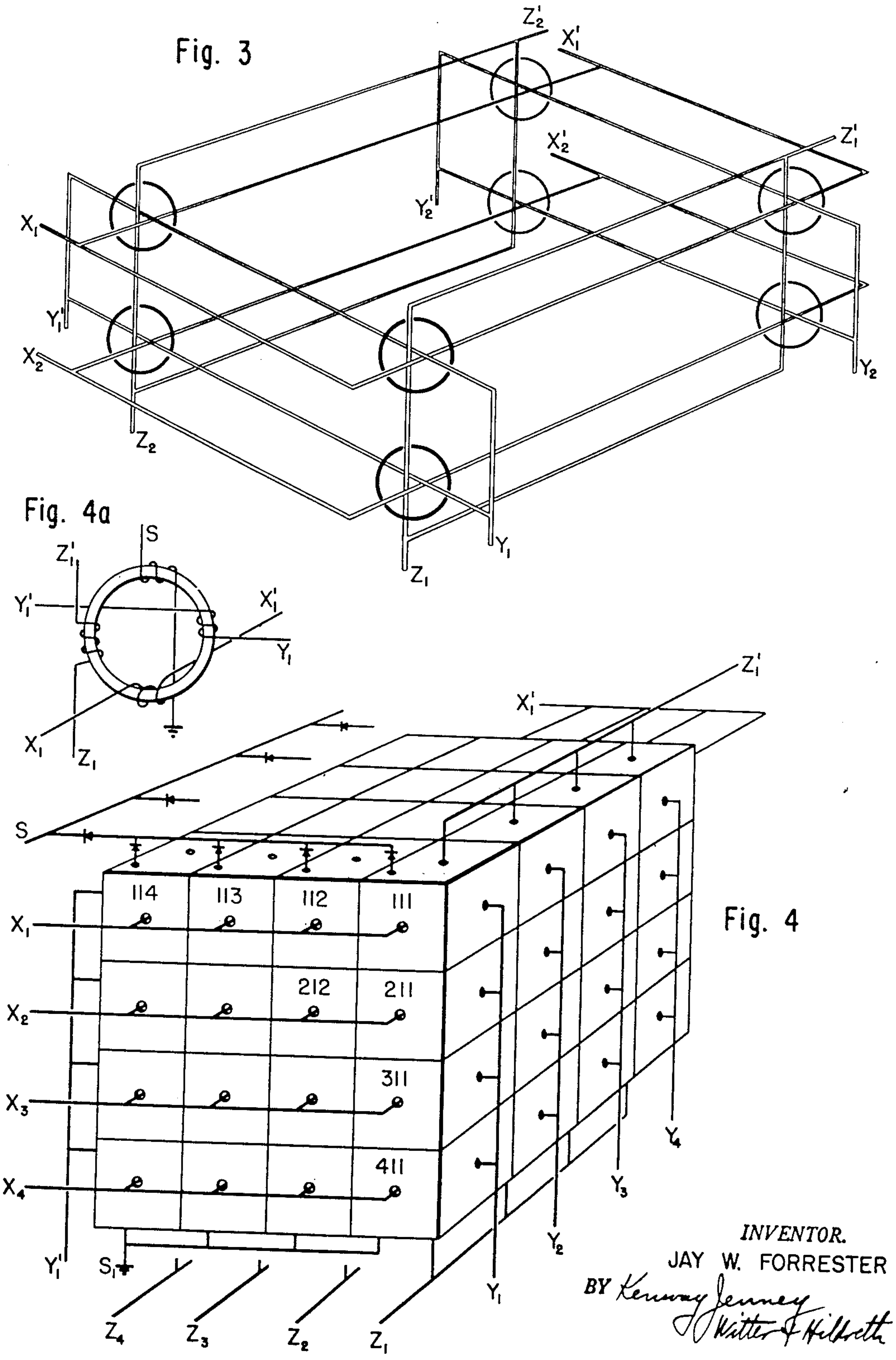
Figure 5:
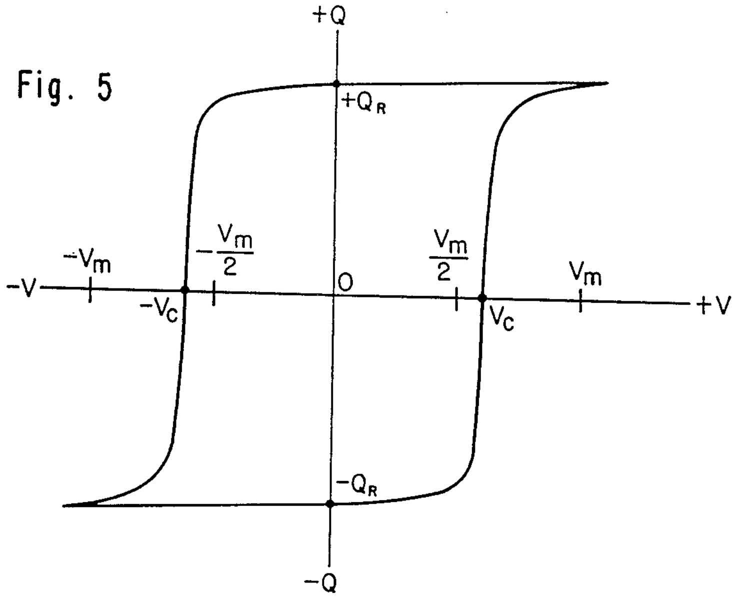
Figure 6:
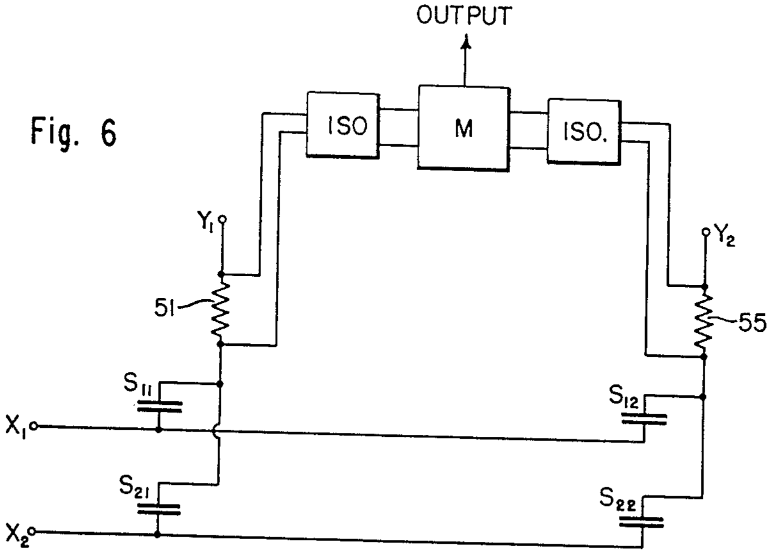
Figure 7:
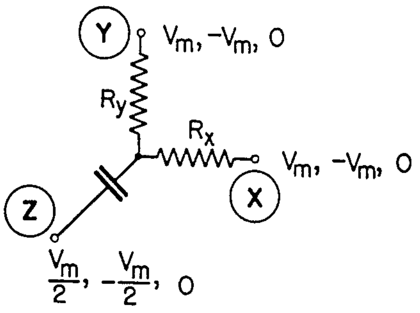
Figure 8:
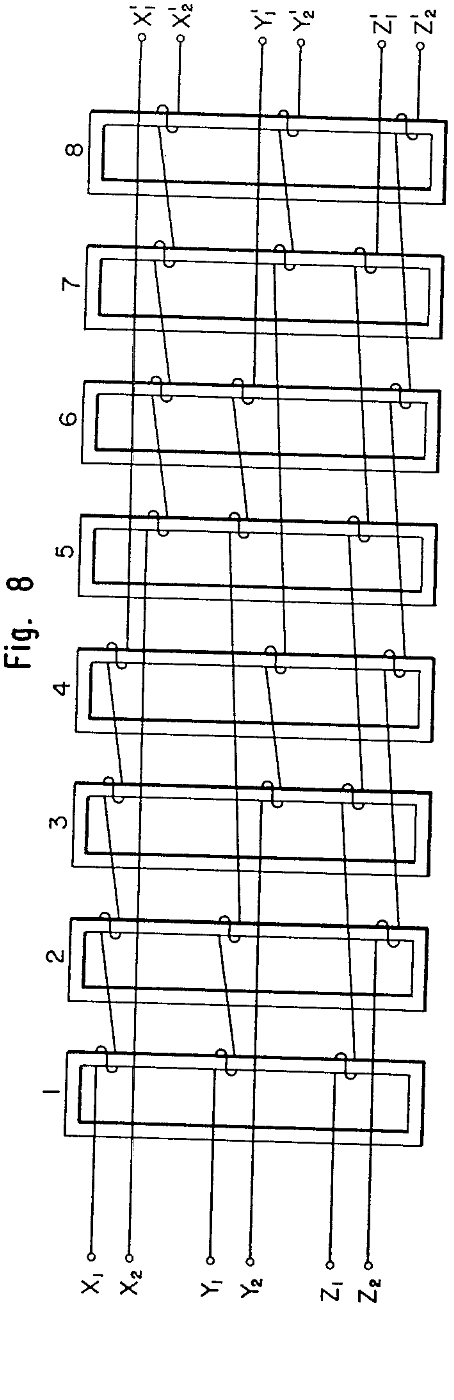
Figure 9:
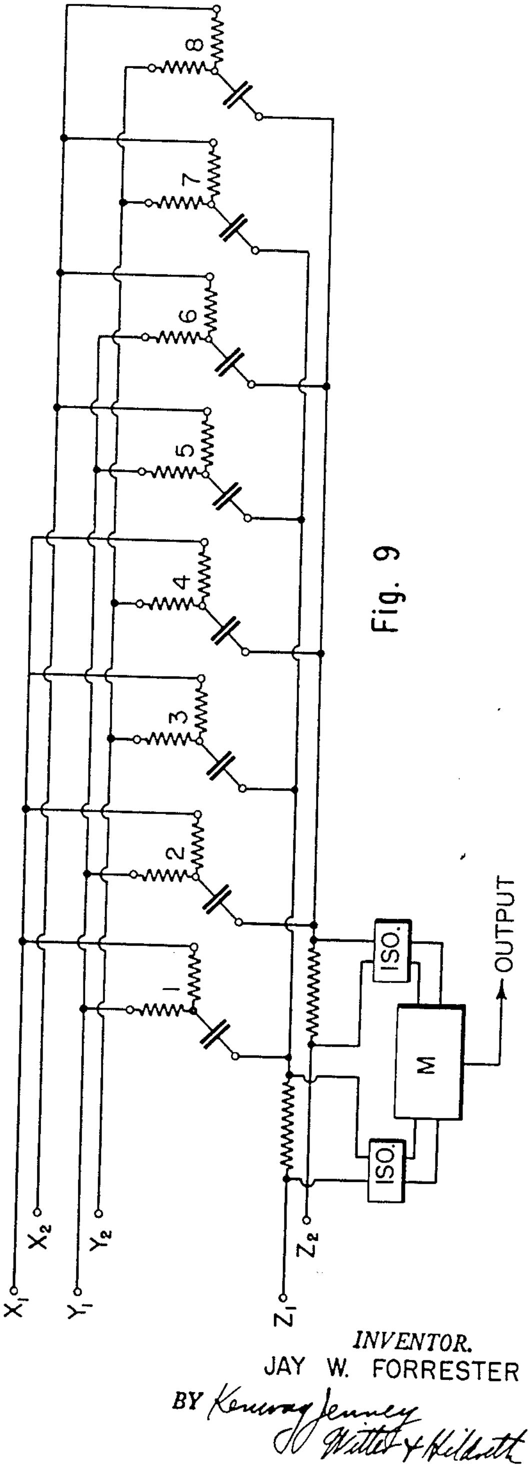

In the accompanying drawings Figure 1 shows an approximate hysteresis curve for a suitable magnetic material. Figure 2 shows a simple two dimensional storage system using toroidal shaped magnetic cores. Figure 3 represents a set of eight storage cubes arranged for three coordinate switching showing in detail the coordinate wiring (see also Fig. 8). Figure 4 shows a larger array of cores arranged in a block with the type of circuiting shown in Fig. 3, but with many of the leads omitted and with part of the sensing circuit shown. Fig. 4*a* shows an individual element in the array. Figure 5 illustrates the charge voltage diagram of an ideal ferroelectric material. Figure 6 is a circuit diagram for the use of ferroelectric slabs as storage units which can be located by the simultaneous selection of two leads. Figure 7 shows one possible arrangement for controlling a given slab by the coordinate use of three leads. Figure 8 illustrates in two dimensions the wiring network used with the eigl in Fig. 3. Figure 9 shows eight of the three co ferroelectric storage units with their accompany cuits arranged in a manner similar to the cores in 3 and 8.

Before describing the preferred forms of the in certain properties of so-called rectangular hystere terial will be explained. Fig. 1 is a B—H curve o hysteresis magnetic material with its rectangular ties emphasized for purposes of explanation. Th A and D represent conditions of zero applied m motive force wherein the core acts as a permanent after excitation by a current flowing in one direc the other through windings around the core. Fo ple, at point A the flux is as indicated, namely, in itive" direction after a positive magnetomotive f sufficient magnitude has been applied and removed. D represents the permanent magnet condition w flux in the opposite direction after a sufficient n magnetomotive force, the result of a current in posite direction, has been applied and removed. ring now to the point D, it will be evident that a ma ing force $H_1$, no matter how often applied and re will not materially affect the core, since the only will be to carry the material through the minor hy loop L. Application of a magnetizing force suff greater than $H_c$ will result in reversal of the field. if, instead of a magnetizing force $H_1$, a force of applied and then removed the state will go from I that is, there will be a complete reversal of flux core. In the same manner a force of −2H produ the application and removal of the same current opposite direction will change the core from stat state D.

The material chosen must show a curve of su breadth to make practicable the use of two such cu and the transition part of the curve must take pla marily between the values $H_1$ and $2H_1$ and thus n relatively steep. This results in a "rectangular" hy material. Of major importance is the fact that re applications of a current producing a force less th (for example $H_1$) will not materially affect the s the core.

Materials having an almost rectangular hysteresi have been used to store electrical information. In applications, as in the present invention, the existe the core at states A and D is said to correspond storage of the binary digits 0 and 1 (or 1 and 0). digit is placed in the core by passing a current of in sufficiently greater than $H_c$ in the proper direction th the coil. To read the information stored in a give a current sufficiently greater than $H_c$ is again a either in the direction designated as positive or direction chosen as negative. If the reading force current) is "positive" and the core was at state A gin with, there will be little change in flux dens direction due to the applied current and only a sma rent in the output circuit. Conversely, if the cor at state D and a strong positive H, exceeding $H_c$, plied, the field will reverse to state A with an atte strong output. The output will thus depend on wl the core stored a 0 or a 1. Since reading is exact same as writing, the reading will erase whateve written and will leave the core in that state whicl responds to the direction of the reading current. ever, if desired, the previously stored informatio be rewritten.

The above use of magnetic cores with a single ex and reading current exceeding $H_c$ is not fundame different from the use of other existing memory d in that each core is located separately or is part of a line, as mentioned. The present invention, however, template the use of these cores as part of a matrix of cores any one of which may be located by coordinate wires in a way similar to that by which a point on graph paper is located by reference to the axes running through it.

Fig. 2 shows a simplified two-coordinate form of the present invention. It has four cores shown as being of toroidal form, the cores being indicated at 6. They are of material having the characteristics indicated in Fig. 1. The cores are arranged in two rows of two each.

Each core is provided with three coils. Two of the coils are energizing devices, which may be designated an $x$-coordinate coil and a $y$-coordinate coil. Each core has a sensing or output coil. For the core in the upper left corner, the $x$-coordinate coil is designated 8, the $y$-coordinate coil 10 and the sensing coil 12. The other three cores have coils similarly arranged. For convenience of designation the four cores are designated by dual notation $C_{11}$, $C_{12}$, $C_{21}$ and $C_{22}$.

The $x$-coordinate coil 8 of the core $C_{11}$ and the corresponding $x$ coil of $C_{12}$ in the upper row are connected in series to an input lead 16 while corresponding coils of the second row are connected to an input connection 18. The $y$-coordinate coils of the first column, $C_{11}$ and $C_{21}$, are connected in series to a $y$-input lead 20, while the $y$-coordinate coils of the second column are connected in series to an input lead 22. Each of the leads 16, 18, 20, and 22 can be switched independently to either a positive or negative current source while at the same time the opposite terminal is switched to a negative or positive source, thus allowing the passage of current in either direction through each wire. One direction of the current is arbitrarily said to produce a positive force.

In order to record information in core $C_{11}$ it is necessary to place a current sufficient to produce the force $+H_1$ simultaneously in the $X_1$ and $Y_1$ wires (16 and 20). If this is done the force $2H_1$ will have been impressed on core $C_{11}$ only. If core $C_{11}$ was at state D it will be switched to state A. Cores $C_{12}$ and $C_{21}$ on the other hand will have received only a single $H_1$ current, which is insufficient to change their magnetic state, and core $C_{22}$ will have received no current at all.

Therefore if all of the cores are originally at state D the effect of putting in simultaneous positive impulses at 16 and 20 will be to convert core $C_{11}$ to state A while leaving all remaining cores unaffected.

In the storage of information the states D and A may be designated as corresponding to the storage of the binary digits 0 and 1. Once they have been magnetized the cores always exist in ether state A or D, and once a core state is determined by the simultaneous application of currents totaling sufficiently more than $H_c$ (e. g. 2H) it will remain in that condition through repeated currents of less than $H_c$ (e. g. $H_1$). A group of cores may thus be used in a variety of ways to store binary information. One method is as illustrated by the use of a group of four cores such as that in Fig. 2 to store numbers in the binary system from 0 to 16, the switching being arranged so that the 0's and 1's are recorded in the various cores in an orderly succession and read out in the same order. In what is considered its most useful application, however, a number of such core arrays are used, and a group of digits is recorded by putting one digit of the group in the corresponding core of each array. This application would be used by the parallel type of computing machine and is made possible by the fact that information can be placed in and read out of a single core at any part of the array without disturbing the other cores.

In order to "read" the stored information as mentioned above, the sensing windings 12 are used. As shown in Fig. 2 all of the windings 12 of the first row are connected in series between ground and a rectifier 24 which is connected to an output circuit 26. Similarly the sensing windings of the second row are connected in series through a rectifier 28 with the same output circuit 26.

Reading of the stored information is carried ou procedure similar to storage and depends on the f whenever there is a complete reversal of flux core, there will be an output voltage induced in tl ing coil 12. To illustrate the method used consi previous example where the core $C_{11}$ is in state the other cores remain in state D. Let us assu in order to read the contents of a core the same taneous coincidental currents are used that result ing the core in state D. In the case of core would be done by attaching leads 16 and 20 to tive source and causing the current to pass in the c direction from that already used to record. In t of core $C_{11}$ this reading pulse will return the core D and this change will result in an induced voltag output coil 12 which causes a current to pass tl be detected in the output circuit 26. If the same taneous negative pulses were passed through any other coils, which were in state D already, there little or no change and negligible output. Ar may be read at will, and the existence of an appı output may be said to correspond to the storag binary digit 1 while relatively little output may ignated as the digit 0. The cores may also be r in succession, the output then being a series of digits corresponding to a binary number.

The two-coordinate arrangement may be exter any desired size. Thus, in Fig. 2, the windings c gizing devices of the four magnetic elements o are arranged in two main groups, which may be the X-group and the Y-group. Each group is divic two sub-groups; the X-group is divided into tl groups $X_1$ and $X_2$ while the Y-group is divided i sub-groups $Y_1$ and $Y_2$, as indicated by the lead c tions of Fig. 2. There are an X-winding and a ing on each core, as well as a sensing winding. Tl principles apply to a larger system. For exam cores may be arranged in eight rows of eight corе There will be 64 windings in the X-group and 64 Y-group, and each of these main groups will be into 8 sub-groups. The total number of connecti then be eight for the $x$-coordinate and eight for coordinate, a total of sixteen. The minimum of input leads required to locate a given core in th manner may be seen to be $2\sqrt{\text{number of cores}}$. I to achieve greater simplicity and efficiency the sam cident current principle is used to locate a stora in a three-dimensional grouping.

The coincident current approach using three nates can be most easily explained by assuming of three positive currents $$\frac{H_m}{3}$$

of such a value that if two of these currents are taneously applied to the core they will not ma change its condition whereas the application of thr lar currents at once will control the state of th This possibility is illustrated on the negative axis of and Figs. 3 and 4 show a circuit arrangement maki sible the easier location of any one of a large gı cores. Figure 3 is intended to make clear the coo analogy used to describe the location of a core. ever, the same connections may be made on eigh arranged in two dimensions as Fig. 8 illustrates.

The preferred circuit arrangement is based geometric fact that three planes can intersect at oı point, though it should be remembered that this is only an aid to easier understanding. Fig. 4 rep an array of cores placed closely together in a rect formation, each core being wound by three excitin similar to the two depicted in Fig. 2, and also by a coil for sensing purposes. In practice a single turn by definition is merely a straight wire passing thro core, suffices for each winding. Figure 3 shows the circuit arrangement of Fig. 4 in greater detail using a grouping of only eight cores. While the number of coordinates in Fig. 3 is smaller, the following explanation applies to both figures.

Lead $X_1$ connects to all of the cores in the top plane of cores depicted in the array, the connection being either in parallel or series. When $X_1$ is connected to a positive voltage source all the cores on the top of the cube receive a $$\frac{+Hm}{3}$$

current. Lead $X_2$ connects in the same manner as lead $X_1$ to all the cores in the layer next to the top, and in the same way $X_3$ and $X_4$ connect with their respective horizontal planes of cores. The leads themselves are omitted for clarity, but the small cubes, each of which represents a core, are labeled with the leads which connect to them.

Lead $Z_1$ connects in series or parallel to all the cores which form the right front face of the array. These cores together form a vertical plane of cores, the front members of which are shown as connecting to $Z_1$. Leads $Z_2$, $Z_3$, and $Z_4$ connect to their respective parallel groups of cores.

Lead $Y_1$ connects in the same way to all the cores which form the front face of the array. Leads $Y_2$, $Y_3$ and $Y_4$ connect in turn to those cores which form vertical planes parallel to Y. The cores themselves are numbered with the coordinates passing through them, the $x$ coordinate being given first, $y$ second, and $z$ third.

In order to control the state of a given core, for example to change it from state D to state A, it is necessary to place a $$\frac{+H}{3}$$

in all three circuits passing around that core. Two of these currents coinciding will not be sufficient to materially affect the core. To place information in the upper right hand front core a current of $$\frac{+Hm}{3}$$

is placed in the $X_1Y_1$ and $Z_1$ planes of cores by switching each of those terminals to the proper source. Only core (111) which is shared in common by the three circuits referred to will receive $$3\,\frac{Hm}{3}$$

currents and thus be controlled by the recording impulses. The top front and right hand front rows of cores (112, 113, 114, 211, 311, 411) will have received $$2\,\frac{Hm}{3}$$

currents simultaneously, the rest of the visible cores will have received an $$\frac{Hm}{3}$$

current, while the rest of the array, which is not visible, will not have received any current. Any core in the array could have as easily been controlled by choosing those coordinates which pass through it.

It can be demonstrated that the minimum number of leads required to locate a core in this manner is achieved in a cube, and this number is $3\sqrt[3]{\text{number of cores}}$. For example with a block of 64 cores any core can be located by the use of only 12 leads as against 16 for a two coordinate arrangement, and the simplification is even more evident where greater numbers of cores are used. As in the previous case, the sensing circuit $S_1$ shows an output whenever a core changes its flux direction, and if three $$\frac{-Hm}{3}$$

pulses were applied to $X_1Y_1Z_1$ for a reading o would return to state D and the output circuit dicate that it had been in state A, storing a The output circuit as shown is connected in the same group of cores as the Y circuits, one e plane being grounded and the other end leadi rectifiers to the output circuit for the matrix.

While this arrangement provides easy visua the method of locating a core using three posi cuits, the principle being developed here could to the use of four or more coincident current circuits may be laid out in the manner of those In general, it will be seen by reference to Figs. that if $n$=the humber of "coordinates," and $A$ ber of sub-groups within each coordinate (als the number of input leads per coordinate), the ber C of cores is $$C=A^n$$

The quantity $n$ also represents the number o (or other excitation devices) per core, and is al the number of coincident excitations to chang from one stable state to the other. The quanti capacity of the system, that is, C units of inforn be stored. The total number of input leals $n$A, which is equal to $$n\sqrt[n]{C}$$

In systems of two or three coordinates, it is assign a dimension to each coordinate, as in Fi but a circuit layout of the type shown in Fig. used for any number of coordinates. It will stood that since $n$ represents the number of coi citations to change state, each core must be distinguishing between $n-1$ and $n$ excitations.

The present state of the art, however, is greater certainty is obtainable by requiring the ferentiate only between $H_1$ and $2H_1$ currents. to make it possible to locate one core in a th sional matrix like that described in connection using the same reduced number of leads descri the following procedure is preferred:

In order to record (or read) in core $X_1Y$ using the same $H_1$ and $2H_1$ intensities used coordinate arrangement, currents of $+H_1$ st passed through lead $Y_1$ and lead $X_1$ into all connected to those leads. In this case the core the current will be all the front cores (throug all those in the top layer of the array ($X_1$). top front row of cores is shared in common b layers each of which received a separate $H_1$ these top front cores will have received $2H_1$ c will be changed from state D to state A. I prevent this and achieve recording in core 111 of the $H_1$ currents in the remaining cores in th row must somehow be cancelled. This may passing a $-H_1$ current through the $Z_2$, $Z_3$, ar into all the cores connected to these leads. will be that only core $X_1Y_1Z_1$ will have recei recording pulse.

To read the information in core 111 the previous methods would involve reversing the from A to D by putting $-H$ currents in the leads and $+H$ in leads $Z_2$, $Z_3$, and $Z_4$. As in t ordinate illustration it would be perfectly poss the same pulses to read as to record a 1, the c an arbitrary one which was made in order to ge when a binary 1 had been stored.

The number of leads required to locate a gi a large group by the above three-coordinate well within the capacity of present matrix sw vices and would allow the use, for example, terminals to locate any one of 32768 units of information (a cube of 32 units to the side).

While the invention as so far described is directed to magnetic cores used as coincidence current devices, it may also take the form of coincidence voltage devices such as non-linear condensers made by placing a ferroelectric material between two conducting plates.

A ferroelectric is a dielectric which will maintain a charge after the removal of an impressed voltage, as Fig. 5 illustrates. When a slab of this material is placed between two metal plates a non-linear condenser is formed which may be used as a storage unit. The material is so constituted that it will not materially change its existing charge condition under repeated applications of the voltage $$+\frac{V_m}{2} \text{ or } -\frac{V_m}{2}$$

whereas the voltage $-V_m$ will change a $+Q$ state to $-Q$ and the voltage $+V_m$ will change a $-Q$ state to $+Q$. The designation $+Q$ or $-Q$ indicates merely charged states equal in degree but having the predominance of electrons on opposite sides of the slab. This polarity and charge ($+Q$ and $-Q$) may be used to designate the binary digits 1 and 0. For use as storage devices a group of these slabs, each between two metal plates, may be arranged as shown in Figure 6.

Each of the four slabs, designated $S_{11}$, $S_{21}$, $S_{12}$, and $S_{22}$, has one face connected in parallel with one of the other plates to an X ($X_1$ or $X_2$) terminal while the other plate is connected also in parallel to a Y ($Y_1$ or $Y_2$) terminal through a sensing resistor (designated 51 and 55) which is placed in series in the line. Across each of the resistors are located the leads from a voltage-sensitive isolating device such as an ordinary vacuum tube or transformer, the output of which goes to a mixing circuit which produces the final output for the group. Each terminal may be switched to a $$+\frac{V_m}{2}$$

source, a $$-\frac{V_m}{2}$$

source, or to ground. To select for storage a given slab, for example slab $S_{21}$, line $X_2$ is switched to a $$-\frac{V_m}{2}$$

source while $y_1$ is switched to a $$+\frac{V_m}{2}$$

source. These two voltages will produce across the slab a potential difference of $V_m$ which will control the charge on the condenser $S_{21}$; however, $S_{22}$ will have only one voltage of $$-\frac{V_m}{2}$$

on one side while the other is grounded and this will not be enough to overcome the existing charge state ($+Q$ or $-Q$) of that slab. The same is true of $S_{11}$, while $S_{12}$ is not affected at all by the lines chosen. It should be noted that the terminal of each line is always grounded except when it is switched to a positive or negative voltage source. Each time there is a change in the ferroelectric material from the polarity designated $+Q$ to $-Q$ (or vice versa) there will be a current flow in the wires connecting to the faces of the plates. This current will generate a voltage in the resistors which are in series with the wires and these voltages when properly mixed using an isolating network, will form the output. This output, or the lack of it, when the $$+\frac{V_m}{2} \text{ and } -\frac{V_m}{2}$$

voltages are impressed on the slab simultaneously will cate what the dipole alignment of the slab was befo voltage was impressed, and thus will indicate wheth was at state $+Q_r$ or $-Q_r$ (i. e. 1 or 0). It will be that the operations of "writing" information and " ing" it are exactly the same, and at all times the slab one state or the other ($+Q$ or $-Q$).

To carry out the example already commenced, as that the alignment obtained by switching the X ter to a negative $$\frac{V_m}{2}$$

source and the Y lines to an equal positive source is nated as forming the condition $-Q$ in each slab constitutes the storage of the binary 0. If it is the sired to store a binary 0 in slab $S_{11}$ the individual t nals $X_1$ and $Y_1$ can be respectively made negative positive by the desired amount. A binary 1 coul stored in $S_{11}$ by reversing the polarity and switchin to a negative $$\frac{V_m}{2}$$

source and $X_1$ to a positive $$\frac{V_m}{2}$$

source. As explained above this will reverse the pol of the $S_{11}$ slab only.

Each time a condenser changes polarity there will current flow in both wires attached to that slab, since will be a flow of electrons off of one plate and onto other. The resultant voltage across the resistance w is in series with one set of the wires may then be se and fed through an isolating device (a transformer vacuum tube for example) into the mixer for the ou signal. If we select for the operation of reading the arrangement of the switches which results in recordi binary 0, then there will be no output if the slab stor 0 and there will be an output (i. e. a current) if the stored a 1, for in the latter case the slab will reverse to the 0 ($-Q$) state with the current flow which att a reversal.

The above described method of storage is useful f two-coordinate system. However, as in the case of magnetic cores, it is desirable to be able to control state of a slab by the use of three or more coordinate order to reduce the required number of leads. While ous connections may be used for "three-dimensional" rays, the following is preferred, since it requires differe tion only between two well separated voltage values.

The preferred system is shown in Fig. 7. This arra ment uses a voltage-dividing network of two appr mately equal resistors to achieve coincidence voltage se tion on one plate while the other plate is switched dire to the positive or negative voltages discussed in the ordinate system, or to ground. The X and Y leads, ing resistors $R_x$ and $R_y$, respectively, in series, both nect to one plate of the condenser. As indicated in diagram the X and Y terminals can be switched to p tive or negative full $V_m$ voltages or to ground, while Z terminal can be switched directly to $$+\frac{V_m}{2}, -\frac{V_m}{2}$$

or 0. It will be seen that a voltage of $$+\frac{V_m}{2}$$

on the XY plate is obtained by having one term switched to a $+V_m$ source while the other remains zero, while a $$-\frac{V_m}{2}$$

voltage on plate XY is obtained by having one terminal at a $-V_m$ potential while the other remains at zero. If one of the X or Y terminals is switched to a positive source while the other is switched to a negative source, the XY plate remains at zero potential. In order to control the charge state on the slab it will be necessary not only to switch one of the X (or Y) terminals to a $V_m$ source while the corresponding Y is at ground, but also at the same time to switch the Z terminal to a $$\frac{V_m}{2}$$

source having the opposite polarity producing a total of $V_m$ on that slab. As in the example with magnetic cores, the unselected Y terminals must at the same time be switched to a $V_m$ source of the same polarity as the Z terminal to prevent selection of several slabs when a group of slabs is involved.

In use these storage units, each consisting of a nonlinear condenser and two resistors, may be connected as shown in Fig. 9. This connecting network is schematically identical with that shown in Fig. 8 for the magnetic cores. Each X, Y, or Z lead connects with four of the eight storage units involved, the choice of units being systematically staggered. This network can be expanded to a large block of storage units in the same way that Fig. 3 was expanded into the block shown in Fig. 4. The selection procedure is similar to the preferred magnetic three-coordinate system which required the core to distinguish between only two values of H. Assume that the group of slabs is preset at the storage of binary 0 ($-Q$ or $+Q$) by switching the Z terminals to a negative $$\frac{V_m}{2}$$

and all the X (or Y) terminals to $+V_m$ sources. Then to record a binary 1 in slab $S_{111}$, $X_1$ is switched to a $-V_m$ source, $Y_2$ (i. e. all Y terminals except $Y_1$) is switched to a $+V_m$ source, and $Z_1$ is switched to a $$+\frac{V_m}{2}$$

source, thereby reversing the polarity of $S_{111}$ only and leaving the other slabs in their existing state. As before all terminals not in use are grounded. To discover the state of $S_{111}$, $X_1$ is switched to a $+V_m$ source, $Y_2$ to a $-V_m$ source and $Z_1$ to a $$-\frac{V_m}{2}$$

with the attendant current and voltage output if a 1 was stored (i. e. the slab changed) and none if a zero was stored (i. e. there was no change in the slab).

The number of terminals which would be necessary is again as low as $$3\sqrt[3]{\text{number of condensers}}$$

and this number of leads is well within the capacity of present matrix switching devices. The ferroelectric system has the additional advantage of permitting the relatively simple production of large-capacity storage arrays by the use of printed circuits on sheets of ferroelectric material.

Having thus described the invention, I claim:

1. An information storage device comprising a plurality of individual elements, each element having two stable states and having a response-excitation characteristic of a substantially rectangular hysteresis-loop type, a plurality of energizing means for each element, said energizing means being designated by coordinates for each element, connections for effecting simultaneous energization of all corresponding energizing means of a group of elements having the same coordinate designation, whereb said elements receives an excitation sufficient t partial change of state, and switching means for coincidental energization of more than one e means for selected elements.

2. The apparatus of claim 1, together wit means for each element responsive to a change thereof.

3. An information storage apparatus comprisi rality of individual storage elements, each cons a magnetic core having nearly rectangular hyster erties, a plurality of separate independent and unc energizing conductors for each core, each conduc common to a group of cores and energizing all in that group sufficiently to effect a partial change the conductors being arranged in coordinate gro means for controlling the coincidental excitatio unique coordinate combination of energizing co of a selected core to effect a change of state ther out changing the state of the other energized cor energized coordinate groups.

4. The apparatus of claim 3 in which each ele ring of magnetic material, and each energizing c comprises a single wire threaded through a plu several rings in series.

5. Apparatus according to claim 3 having in an output winding for each magnetic element, m terconnecting the output windings of a plurality ments whereby an output pulse of significant m is produced upon a change of state of any magn ment.

6. An information storage device comprising a of individual elements, each element having tw states and having a response-excitation characteri substantially rectangular hysteresis-loop type, a of energizing means for each element, said en means being designated by coordinates for each means for applying to the energizing means in som coordinates sufficient excitation to effect a change of a number of element, and means for applying energizing means of other coordinates a counterac citation to prevent a change of state in any but a storage element.

7. Apparatus according to claim 6 in which th gizing means are arranged in three coordinates counteracting excitations are applied in one of the nates.

8. Apparatus according to claim 6 in which the elements are high-hysteresis magnetic cores, and th gizing means are conductors threaded through the 9. Apparatus for the storage of units of infor comprising a plurality of similar elements respon electrical excitation, each having two stable stat having a response-excitation characteristic of a s tially rectangular hysteresis loop type whereby at threshold excitation is required to change from on to the other, means for generating a plurality of tions, and means for applying to each of the el separate and coincident excitations each of which is capable of effecting a partial change of state whi additively effective to apply a net total excitation than the threshold to any chosen element.

10. Apparatus for the storage of $A^n$ units of inf tion comprising $A^n$ similar elements responsive to cal excitation, each having two distinguishably di zero-excitation states, and two threshold amounts o trical excitation each of which causes a shift fro stable state to the other, and below which excitati substantially no effect after being removed, means f plying to each element separate and coincident excit which are additively effective in the total of $n$ excit to cause a total excitation greater than threshold, connecting said applying means to form $n$ coordi and input leads to A sub-groups within each coord whereby $n$ coincident excitations of any element are sary to effect a change of state thereof, sensing means on each of the $A^n$ elements to generate electric outputs responsive to a change in state of the element, and unidirectional means connecting in parallel all of the $A^n$ sensing means to form one output terminal, with an output for only one direction of change of state.

11. Information storage apparatus comprising a plurality of storage elements, each element having two stable states and having a response-excitation characteristic with substantial hysteresis properties, a plurality of energizing devices for each element, said energizing devices for the several elements being arranged in main groups, each element having an energizing device of each of the several main groups, said main groups being divided into sub-groups, connections to connect all of the energizing devices of each sub-group to provide equal and simultaneous excitation to all of the energizing devices of said sub-group, whereby each element corresponds to a unique combination of sub-groups, and operating means for effecting simultaneous excitation of one or more selected sub-groups from each main group, to cause the combined energizing effect to be above the level necessary to change the stable state of any selected element represented by a unique combination of sub-groups, but below said level for unselected elements of said sub-groups.

12. Information storage apparatus comprising a plurality of magnetic storage elements, each element having two stable states and having a response-excitation characteristic with substantial hysteresis properties, a plurality of energizing windings for each element, said energizing windings for the several elements being arranged in main groups, each element having an energizing device of each of the several main groups, said main groups being divided into sub-groups, connections to connect all of the energizing windings of each sub-group to provide equal and simultaneous excitation to all of the energizing windings of said sub-group, whereby each element corresponds to a unique combination of sub-groups, and operating means for effecting simultaneous excitation of one or more selected sub-groups from each main group, to cause the combined energizing effect to be above the level necessary to change the stable state of any selected element represented by a unique combination of sub-groups, but below said level for unselected elements of said sub-groups.

13. Information storage apparatus as described in claim 12 having in addition at least one output winding for each magnetic element, means for connecting output windings for a plurality of elements in a group whereby an output pulse of significant magnitude will be produced if any magnetic element of the group undergoes a change of state.

14. Apparatus according to claim 12 in which the magnetic elements form a three-dimensional array, and the sub-groups of energizing windings are arranged in planes, whereby any element is uniquely associated with the intersection of three sub-groups of the several main groups.

15. Apparatus according to claim 14 in which the magnetic elements are cores of toroidal form, and the energizing windings comprise wires threaded straight through the cores.

16. Information storage apparatus comprising a plurality of magnetic storage elements, each element having two stable states and having a response-excitation characteristic with substantial hysteresis properties, a plurality of energizing windings for each element, said energizing windings for the several elements being arranged in main groups, each element having an energizing winding of each of the several main groups, said main groups being divided into sub-groups, series connections for the energizing windings of each sub-group, each element corresponding to a unique combination of sub-groups, and operating means for effecting simultaneous excitation of one or more selected sub-groups from each main group, to cause the combined energizing effect to be ab level necessary to change the stable state of any element represented by a unique combination groups, but below said level for unselected elen said sub-groups.

17. Apparatus according to claim 16, in whi magnetic storage element comprises a toroidal magnetic material and a single wire is passed several cores in series to form the energizing win a sub-group.

18. Information storage apparatus comprising rality of storage elements, each element havi stable states and having a responsive-excitatio acteristic with substantial hysteresis properties, rality of energizing devices for each element, s ergizing devices for the several elements being a in main groups, each element having an energiz vice of each of the several main groups, said main being divided into sub-groups, connections to con of the energizing devices of each sub-group to equal and simultaneous excitation to all of the ing devices of said sub-group, whereby each elem responds to a unique combination of sub-grou operating means for effecting simultaneous excita one or more selected sub-groups from each of of the main groups to cause the combined energi fect thereof to be above the level necessary to the stable state of a selected element and other el and operating means for effecting counteracting ex of sub-groups from at least one other main gr restrict the total effective change-of-state excita any selected element represented by a unique co tion of sub-groups.

19. Information storage apparatus comprising rality of magnetic storage elements, each element two stable states and having a response-excitatio acteristic with substantial hysteresis properties, a p of energizing windings for each element, said enc windings for the several elements being arranged i groups, each element having an energizing winc each of the several main groups, said main group divided into sub-groups, connections to connect all energizing windings of each sub-group to provid and simultaneous excitation to all of the energizin ings of said sub-group, whereby each element corre to a unique combination of sub-groups, and op means for effecting simultaneous excitation of more selected sub-groups from each of certain main groups to cause the combined energizing thereof to be above the level necessary to chan stable state of a selected element and other elemen operating means for effecting counteracting excita sub-groups from at least one other main group to the total effective change-of-state excitation to a lected element represented by a unique combinat sub-groups.

20. Apparatus according to claim 19 in which th netic elements form a three-dimensional array, a sub-groups of energizing windings are arranged in whereby any element is uniquely associated with tersection of three sub-groups of the several main g 21. Apparatus according to claim 20 in which th netic elements are cores of toroidal form, and the e ing windings comprise wires threaded straight thro cores.

22. An information storage apparatus comprising rality of individual storage elements, each elemer ing two stable states and having a response-exc characteristic of a substantially rectangular hys loop type, whereby any element will remain unc during one degree of excitation but is capable of ing upon a multiple of said excitation, the elements arranged in groups according to two or more indep coordinates, whereby an element is uniquely designa its coordinates, a plurality of energizing means fo element each capable of temporarily effecting a partial change of state and each being energized independently by one coordinate of that element, and circuit means to effect coincidental excitation of the energizing means of selected elements by energizing the coordinate groups including that element to control the transfer thereof from one stable state to the other.

23. A magnetic core array comprising a plurality of rings of magnetic material, each having substantially rectangular hysteresis properties and capable of assuming either of two stable states in which the flux exists in opposite directions in the ring, the several rings being arranged in rows and columns, a set of separate wires, each passing through all of the rings of a row, a second set of wires, each single wire of which passes through all of the rings of a column, whereby each ring is threaded by two wires, means for exciting any wire of a set to effect a partial change of state of the rings through which it passes, and means for simultaneously exciting one wire of each set to excite the core at their intersection sufficiently to effect a change from one stable state to the other.

24. An array as defined in claim 23 in which each single wire is threaded straight through all of the rings of a row or column.

25. Apparatus for controlling an array of bistable elements comprising a plurality of elements, each having two stable states and having a response-excitation characteristic of a substantially rectangular hysteresis-loop type, the elements being arranged in groups according to two or more independent coordinates, whereby an element is designated by its coordinates, energizing means for each coordinate of each element, each energizing means being capable of effecting a partial change of state, and circuit means to control the coincidental excitation of the energizing means of any selected element to control the transfer thereof from one stable state to the other.

26. In an array of bistable magnetic elements each having substantially rectangular hysteresis properties and capable of assuming either of two stable states and requiring excitation above a critical level to effect a change of state, apparatus to set the state of any selected element in the array to either of the two stable states, which comprises a plurality of magnetizing leads for each element, each lead energizing a unique group of elements whereby each element may be separately energized by a unique combination of leads, means for energizing each lead to effect a partial change of state of each element of its group, and control means for selectivel ing the leads to effect a net total energizati the critical level for a selected element corresp one combination of leads, while maintaining the of unselected elements below the critical level.

27. A magnetic core array comprising a pl rings of magnetic material, each having substa tangular hysteresis properties and capable of either of two stable states in which the flux exi posite directions in the ring, the rings being in a two-dimensional array of rows and colun of coordinate energizing wires each of whi through all of the rings of a row, a second set nate energizing wires each of which passes th of the rings of a column, whereby any ring is designated by the intersection of two coordin gizing wires, and sense winding means coupled of the cores of the array.

28. A three-dimensional magnetic core array ing a plurality of arrays as defined in claim 2 third set of energizing wires, each of which passe a group of rings.

29. A three-dimensional magnetic core array ing a plurality of arrays as defined in claim 27 set of energizing wires, each of which passes t group of rings, and connections for the severa wires to arrange said wires in three intersectin nate planes.

References Cited in the file of this paten

UNITED STATES PATENTS

| | | |
|---|---|---|
| 1,504,882 | Elmen | Aug. |
| 2,053,156 | Livingston | Sept |
| 2,430,457 | Dimond | Nov. |
| 2,518,022 | Keister | Aug |
| 2,519,513 | Thompson | Aug. |
| 2,524,154 | Wood | Oct. |
| 2,574,438 | Rossi et al. | Nov |
| 2,696,600 | Serrel | Dec. |

OTHER REFERENCES

Publication: Proc. of IRE, April, 1952, pp. ‹

Publication: Progress Report (2) on the I vol. II, published June 30, 1946, Moore School trical Engineering, U. of Pa., Phila., Pa., (e paragraph 4.2.12 etc., and Figs. 17*a*, *b* and *c*).

Thesis by M. K. Haynes, published Dec. 28, 1 24–28.